United States Patent
Dellinger et al.

(10) Patent No.: US 9,702,991 B2
(45) Date of Patent: Jul. 11, 2017

(54) SYSTEM AND METHOD FOR PERFORMING SEISMIC SURVEYS WITH A CONTROLLED SOURCE USING MAXIMUM-POWER SWEEPS

(71) Applicants: Joseph Anthony Dellinger, Houston, TX (US); Mark Francis Lucien Harper, Cambridge (GB)

(72) Inventors: Joseph Anthony Dellinger, Houston, TX (US); Mark Francis Lucien Harper, Cambridge (GB)

(73) Assignee: BP Corporation North America Inc., Houston, TX (US)

( * ) Notice: Subject to any disclaimer, the term of this patent is extended or adjusted under 35 U.S.C. 154(b) by 381 days.

(21) Appl. No.: 14/487,317

(22) Filed: Sep. 16, 2014

(65) Prior Publication Data

US 2015/0092517 A1    Apr. 2, 2015

Related U.S. Application Data

(60) Provisional application No. 61/883,437, filed on Sep. 27, 2013.

(51) Int. Cl.
*G01V 1/38* (2006.01)
*G01V 1/04* (2006.01)
(Continued)

(52) U.S. Cl.
CPC ............... *G01V 1/04* (2013.01); *G01V 1/005* (2013.01); *G01V 1/0475* (2013.01); *G01V 1/38* (2013.01); *G01V 1/40* (2013.01)

(58) Field of Classification Search
CPC .......... G01V 1/38; G01V 1/40; G01V 1/0475; G01V 1/04; G01V 1/005
See application file for complete search history.

(56) References Cited

U.S. PATENT DOCUMENTS 8,619,497 B1 * 12/2013 Sallas ................. G01V 1/38
                                                        367/23
8,792,300 B2    7/2014 Sallas
(Continued)

FOREIGN PATENT DOCUMENTS

| EP | 2267486 | 12/2010 |
| EP | 2748643 | 7/2014 |
| WO | 2014076076 | 5/2014 |

OTHER PUBLICATIONS

PCT Search Report dated Feb. 24, 2015.

*Primary Examiner* — Krystine Breier
(74) *Attorney, Agent, or Firm* — K. KaRan Reed

(57) ABSTRACT

The output spectrum of a controllable swept-frequency acoustic source at a given frequency can be controlled by making the rate of change of frequency equal to the desired output power spectrum divided by the squared envelope amplitude of the source output signal, both measured at the time after the start of its frequency sweep at which the sweep frequency passes through the given frequency. The system and method can also be used to correct for propagation effects outside the source by dividing the desired spectrum by the propagation effect. The method can further be used either to obtain an output spectrum of a desired shape from a source operating at maximum output or to design a sweep of a minimum feasible duration that will result in an output spectrum of a specified shape and with a specified amplitude.

15 Claims, 10 Drawing Sheets

(51) Int. Cl.
*G01V 1/00* (2006.01)
*G01V 1/40* (2006.01)
*G01V 1/047* (2006.01)

(56) References Cited

U.S. PATENT DOCUMENTS

| | | |
|---|---|---|
| 8,902,698 B2 | 12/2014 | Hegna et al. |
| 8,907,506 B2 | 12/2014 | Marin |
| 8,950,263 B2 | 2/2015 | Giordano et al. |
| 2008/0253226 A1 | 10/2008 | Tenghamn et al. |
| 2011/0085416 A1* | 4/2011 | Sallas .................... G01V 1/005 367/38 |
| 2012/0063263 A1 | 3/2012 | Kamata et al. |
| 2012/0155217 A1 | 6/2012 | Dellinger et al. |
| 2013/0021875 A1 | 1/2013 | Eick et al. |
| 2013/0100766 A1 | 4/2013 | Teyssandier et al. |
| 2013/0155810 A1 | 6/2013 | Dowle et al. |
| 2013/0193693 A1 | 8/2013 | Marin et al. |
| 2013/0264141 A1 | 10/2013 | Wei et al. |
| 2013/0308422 A1 | 11/2013 | Eick et al. |
| 2013/0333974 A1 | 12/2013 | Coste et al. |
| 2014/0043937 A1 | 2/2014 | Teyssandier et al. |
| 2014/0104986 A1 | 4/2014 | Teyssandier et al. |
| 2014/0112097 A1 | 4/2014 | Dowle et al. |
| 2014/0226439 A1 | 8/2014 | Tenghamn |
| 2014/0254312 A1 | 9/2014 | Dowle et al. |
| 2014/0254313 A1 | 9/2014 | Dowle et al. |

* cited by examiner

SYSTEM AND METHOD FOR PERFORMING SEISMIC SURVEYS WITH A CONTROLLED SOURCE USING MAXIMUM-POWER SWEEPS

CROSS-REFERENCE TO RELATED APPLICATIONS

This application claims priority under 35 USC §119(e)(1) of prior U.S. Provisional Patent Application Ser. No. 61/883,437, filed Sep. 27, 2013, which is hereby incorporated by reference in its entirety.

TECHNICAL FIELD

This disclosure relates to the general subject of seismic exploration and surveillance and, in particular, to methods for acquiring seismic and other signals that are representative of the subsurface for purposes of seismic exploration and/or surveillance.

BACKGROUND

A seismic survey represents an attempt to image or map the subsurface of the earth by sending sound energy down into the ground and recording the "echoes" that return from the rock layers below. The source of the down-going sound energy might come, for example, from explosions or seismic vibrators on land, or air guns in marine environments. During a seismic survey, the energy source is placed at various locations near the surface of the earth above a geologic structure of interest. Each time the source is activated, it generates a seismic signal that travels downward through the earth. "Echoes" of that signal are then recorded at a great many locations on the surface. Multiple source/recording combinations are then combined to create a near continuous profile of the subsurface that can extend for many miles. In a two-dimensional (2-D) seismic survey, the recording locations are generally laid out along a single line, whereas in a three dimensional (3-D) survey the recording locations are distributed across the surface in a grid pattern. In simplest terms, a 2-D seismic line can be thought of as giving a cross sectional picture (vertical slice) of the earth layers as they exist directly beneath the recording locations. A 3-D survey produces a data "cube" or volume that is, at least conceptually, a 3-D picture of the subsurface that lies beneath the survey area. In reality, though, both 2-D and 3-D surveys interrogate some volume of earth lying beneath the area covered by the survey. Finally, a 4-D (or time-lapse) survey is one that is recorded over the same area at two or more different times. Obviously, if successive images of the subsurface are compared any changes that are observed (assuming differences in the source signature, receivers, recorders, ambient noise conditions, etc., are accounted for) will be attributable to changes in the subsurface.

A seismic survey is composed of a very large number of individual seismic recordings or traces. The digital samples in seismic data traces are usually acquired at 0.002 second (2 millisecond or "ms") intervals, although 4 millisecond and 1 millisecond sampling intervals are also common. Typical trace lengths when conventional impulsive sources are used are 5-16 seconds, which corresponds to 2500-8000 samples at a 2-millisecond interval. If a non-impulsive source is used, the extended activation time of the source needs to be accommodated for, so the trace lengths will generally be longer. Conventionally each trace records one seismic source activation, so there is one trace for each live source location-receiver activation. In some instances, multiple physical sources might be activated simultaneously but the composite source signal will be referred to as a "source" herein, whether generated by one or many physical sources.

In a typical 2-D survey, there will usually be several tens of thousands of traces, whereas in a 3-D survey the number of individual traces may run into the multiple millions of traces.

Although a number of seismic sources are available, controllable sources have been used for many years to obtain land and marine seismic data for use in exploration, reservoir evaluation, etc. For purposes of the instant disclosure, the term "controllable source" will be used to refer to an acoustic seismic source that radiates sound as a swept-frequency signal, whose profile of frequency versus time after the start of the sweep is controllable and continuous, and whose physical limitations impose a limit on the amplitude of its output which will normally vary with frequency.

Controllable sources may be used in circumstances where it is desired to explore an environment via its acoustic response. For example, in exploration seismology signals are radiated into the ground and the echoes that return to the surface are recorded and used to investigate the geology of the subsurface to identify possible locations of oil and gas reservoirs. Controllable sources include, by way of example only, vibroseis sources on land and at sea, marine resonators, etc. General information related to marine resonators may be found in, for example, U.S. patent application Ser. Nos. 12/980,527 and 12/995,763, the disclosures of which are incorporated herein by reference as if fully set out at this point.

In such circumstances it is desirable to control the shape of the spectrum of the acoustic signal transmitted by the source. It is typically also desirable to maximize the source's acoustic power output, which will be limited by its physical capabilities. The power output can be maximized, of course, by simply running the source at the maximum output level it is capable of. In general, though, this level will vary strongly with frequency, so that if the device is swept in frequency at a constant rate it will produce a spectrum whose shape, or variation in relative magnitude with frequency (hereinafter its "frequency profile") is dictated by the source's physical limitations and may not be optimal for the application. For example, the output of a piston source at low frequencies is limited by its piston stroke and is inversely proportional to frequency squared, whereas for the purposes of seismic exploration it is typically desirable to have a flat or approximately flat spectrum. To the extent the spectrum is not flat, distortions appear in the subsurface images that may be difficult or impossible to remove.

Thus, what is needed is a way to generate a seismic signal with a controllable source such that the said signal has frequency properties that have been chosen to yield better images of the subsurface, and to use the controllable source in a maximally efficient way while doing so.

It should be noted that prior art attempts to do this have focused solely on the displacement of the piston as a limiting parameter at low frequencies, and fall back on traditional linear sweeps for higher frequencies, which approach has proven to be unsatisfactory in many cases.

As is well known in the seismic acquisition and processing arts, there has been a need for a system and method that provides a better way to acquire broadband (e.g., about 1-80 Hz) seismic data. Accordingly, it should now be recognized, as was recognized by the present inventors, that there exists, and has existed for some time, a very real need for a method of seismic data processing that would address and solve the above-described problems.

Before proceeding to a description, however, it should be noted and remembered that the disclosure which follows, together with the accompanying drawings, should not be construed as limiting the teachings of this document to the examples (or embodiments) shown and described. This is so because those skilled in the art to which the invention pertains will be able to devise other forms of this invention within the ambit of the appended claims.

SUMMARY

According to one aspect, there is provided a system and method of seismic exploration that makes it possible to image subsurface structures using controllable seismic sources that is superior to that previously available.

An embodiment comprises a method of seismic exploration above a region of the subsurface of the earth containing structural or stratigraphic features conducive to the presence, migration, or accumulation of hydrocarbons, the method comprising: selecting a controllable source; selecting a plurality of parameters characteristic of said controllable source; determining limiting curves for each of said selected plurality of parameters as a function of frequency; using said determined limiting curves to obtain a constraint curve for said controllable source; using said constraint curve to obtain a sweep signal for said controllable source; and, using said sweep signal in conjunction with said controllable source to collect seismic data proximate to a region of the subsurface of the earth.

Another embodiment comprises a method of seismic exploration above a region of the subsurface of the earth containing structural or stratigraphic features conducive to the presence, migration, or accumulation of hydrocarbons, the method comprising: selecting a seismic source, said seismic source comprising a piston for generating a controllable swept frequency signal; determining at least a maximum piston displacement, a maximum piston velocity, and a maximum piston acceleration; using said maximum piston displacement to calculate a displacement limit curve; using said maximum piston acceleration to calculate an acceleration limit curve; using said maximum piston velocity to calculate a velocity limit curve; using said displacement limit curve, said velocity limit curve, and said acceleration limit curve to determine a constrained limit curve; using said constrained limit curve to design a sweep schedule for said seismic source; and, using said sweep schedule to collect seismic data proximate to said region of the subsurface of the earth, thereby exploring within said region of the subsurface of the earth.

A controllable swept frequency seismic source comprises: a housing; a piston within said housing, said piston at least for generating a swept frequency seismic signal; and, a controller in electronic communication with said piston, said controller containing a sweep schedule for moving said piston within said housing to generate said swept frequency seismic signal, wherein said sweep schedule is determined by a method comprising: determining for said piston at least a maximum piston displacement value, a maximum piston velocity value, and a maximum piston acceleration value; using said maximum piston displacement value to calculate a displacement limit curve; using said maximum piston velocity value to calculate a velocity limit curve; using said maximum piston acceleration value to calculate an acceleration limit curve; using said displacement limit curve, said velocity limit curve, and said acceleration limit curve to determine a constrained limit curve; and, using said constrained limit curve to design said sweep schedule for said seismic source.

Another embodiment comprises a method of seismic exploration above a region of the subsurface of the earth containing structural or stratigraphic features conducive to the presence, migration, or accumulation of hydrocarbons, the method comprising: selecting a seismic source, said seismic source comprising a piston for generating a controllable swept frequency signal; determining at least two of a maximum piston displacement, a maximum piston velocity, a maximum piston acceleration, and a maximum piston jerk; for each of said determined at least two of said maximum piston displacement, said maximum piston velocity, said maximum piston acceleration, and said maximum piston jerk, calculating a corresponding limit curve; using said corresponding limit curves to determine a constrained limit curve; using said constrained limit curve to design a sweep schedule for said seismic source; and, using said sweep schedule to collect seismic data proximate to said region of the subsurface of the earth, thereby exploring within said region of the subsurface of the earth.

A further embodiment comprises a method of seismic exploration of a subsurface target, the method comprising: accessing a plurality of seismic traces collected proximate to said subsurface target, wherein said plurality of seismic traces are acquired by a collection method comprising: selecting a seismic source, said seismic source comprising a piston for generating a controllable swept frequency signal; determining at least two of a maximum piston displacement, a maximum piston velocity, a maximum piston acceleration, and a maximum piston jerk; for each of said determined at least two of said maximum piston displacement, said maximum piston velocity, said maximum piston acceleration, and said maximum piston jerk, calculating a corresponding limit curve; using said corresponding limit curves to determine a constrained limit curve; using said constrained limit curve to design a sweep schedule for said seismic source; using said sweep schedule to collect said plurality of seismic traces proximate to said subsurface target; and, using at least a portion of said accessed plurality of processed seismic traces to explore for hydrocarbons proximate to said subsurface target.

Other embodiments and variations are certainly possible within the scope of the instant disclosure and can readily be formulated by those of ordinary skill in the art based on the disclosure herein.

The foregoing has outlined in broad terms the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

Other objects and advantages will become apparent upon reading the following detailed description and upon reference to the drawings in which.

DETAILED DESCRIPTION

Figure 1:
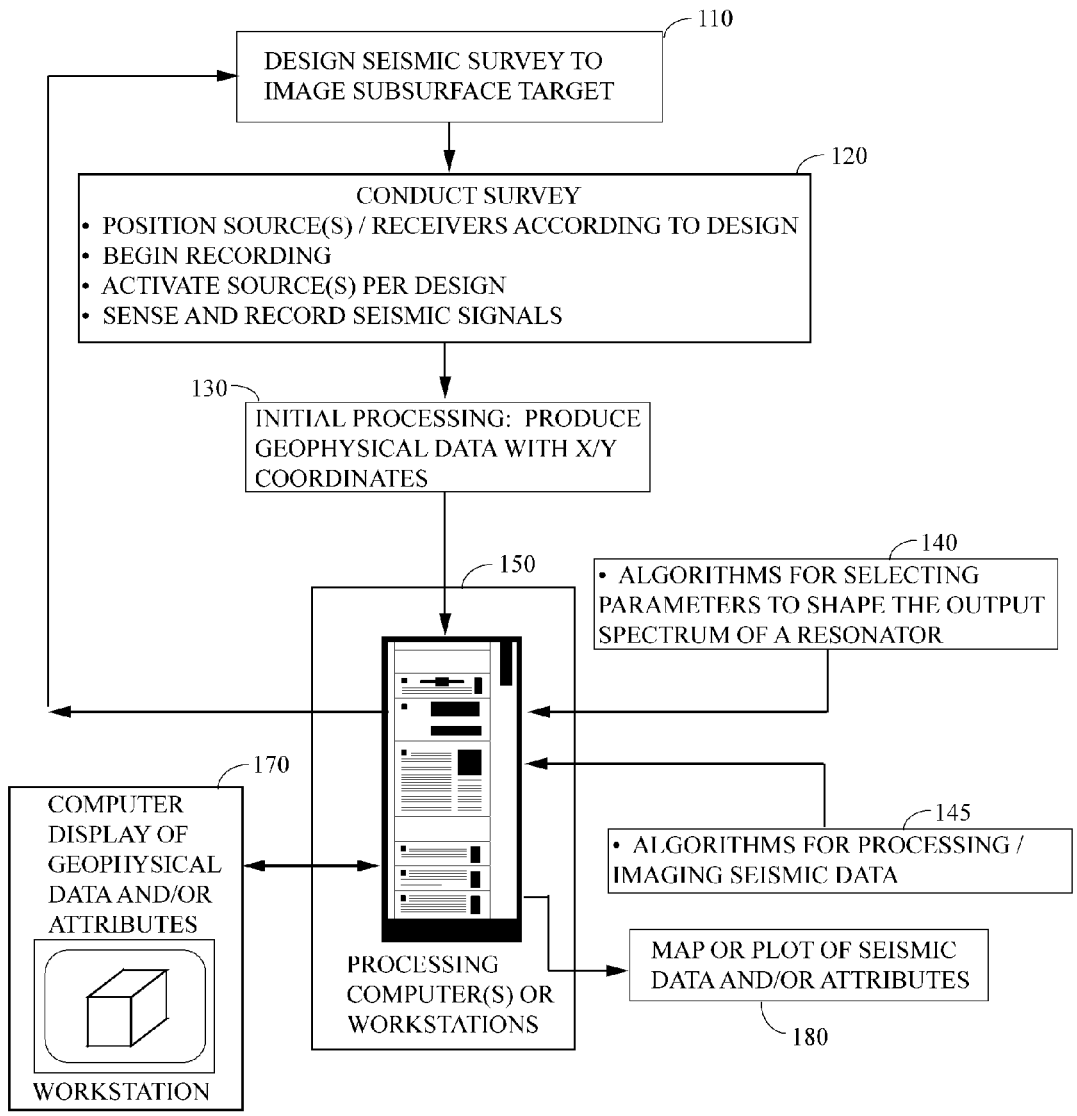
FIG. 1 illustrates a general seismic acquisition and processing environment.

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

One aspect of the instant disclosure teaches a method of obtaining an output signal power spectrum of a desired frequency profile from a controllable sound source such that the source's power output is maximized. The desired frequency profile might be constant within the transmitted frequency band, or it might vary with frequency, for example to maintain a constant signal-to-noise ratio given a measured background noise spectrum that varies with frequency, or to counteract the effect of the source's signal reflecting off the sea surface (the so-called "source ghost"). The instant method does not require the source's power output to be reduced below its maximum capability, which implies that for a given controllable sound source a given target energy-spectrum amplitude accumulated over a single source sweep may be produced that has the minimum possible sweep duration, or alternatively, a given target frequency profile may be produced that has the maximum achievable amplitude for a given allowed sweep duration.

According to another aspect, there is provided a method of determining an optimal sweep profile (sweep frequency as a function of time since the start of the sweep) for a marine resonator using an interrelationship between the desired output frequency profile, the maximum displacement of the resonator piston, the maximum velocity, acceleration, and, optionally, jerk (i.e., the derivative of acceleration) of same, together with the number of seconds in the sweep. According to the methods taught herein, these parameters may be used to determine an effective sweep profile for a particular resonator in order to produce an output spectrum of the desired frequency profile that has maximal amplitude for a given sweep time, or to produce a target output spectrum over a minimal sweep time.

The method in one embodiment relies on the characteristic of a swept-frequency signal that its power spectrum at a given frequency is proportional to the square of its amplitude at the time that it passes through the given frequency, and inversely proportional to its rate of change of frequency at that time, provided the rates of change of signal amplitude and phase are low compared to the signal frequency. In brief, in one embodiment the method consists in adjusting the rate of change of frequency of the sweep signal emitted by the controllable sound source in proportion to the square of its maximal amplitude at that frequency, and in inverse proportion to the desired frequency profile of the signal power spectrum. The power spectrum of the controllable source's output can thereby be made to have a shape that matches the desired target frequency profile. Alternatively, the energy spectrum of the controllable source's output accumulated over a single sweep can thereby be made equal to a desired target amplitude spectrum, and the minimum sweep duration required to achieve this target amplitude spectrum determined. The rate of change of frequency which achieves this will generally vary with frequency and therefore with time after the start of the sweep.

This method will tend to yield more accurate results when the rates of change of the frequency and the envelope of the amplitude are relatively small. That is, it would be best if the rate of change of the frequency, divided by the frequency, is small compared to the angular frequency; and the rate of change of the envelope of the amplitude, divided by the envelope of the amplitude, should also be small compared to the angular frequency. Generally speaking, any waveform that could reasonably be described as a frequency sweep will at least approximately satisfy these conditions.

EMBODIMENTS

According to an embodiment, there is provided a system and method for improving images derived from seismic data (both transmission and reflection) by improving the quality of the source signal that is generated from a controllable source.

This disclosure teaches a method of obtaining a signal power spectrum of a desired frequency profile from a controllable sound source. The desired frequency profile might be constant within the transmitted frequency band, or it might vary with frequency, for example to maintain a constant signal-to-noise ratio given a measured background noise spectrum that varies with frequency, or so as to produce a flat farfield spectrum by taking into account the filtering effect of the reflection of the source signal by the sea surface in the case of a marine source. In an embodiment, the instant method does not require the source's power output to be reduced below its maximum capability.

One variation of the instant method takes as its starting point the observation that the power spectrum of a swept-frequency signal at a given frequency is proportional to the square of its amplitude at the time that it passes through the given frequency, and inversely proportional to its rate of change of frequency at that time. In brief, in one embodiment the method consists of adjusting the rate of change of frequency of the sweep signal emitted by the controllable sound source in proportion to the square of its maximum amplitude at that frequency and in inverse proportion to the desired frequency profile of the signal power spectrum (the squared magnitude of its Fourier transform). The power spectrum frequency profile of its output can thereby be made equal to the desired profile. The rate of change of frequency which achieves this will generally vary with frequency and therefore with time after the start of the sweep.

Thus if the amplitude at any frequency is constrained by the physical source, then the output power spectrum can be shaped by manipulating the rate at which the sweep frequency changes. In particular, a flat output spectrum can be produced despite multiple physical constraints limiting the source's maximum output differently at different frequencies. It can also be adjusted to compensate for propagation effects outside the source.

The maximum amplitude of the source signal will usually be determined by different physical aspects of the source at different frequencies—for piston sources at the lowest frequencies, for example, it is typically defined by the maximum allowable piston stroke, and at somewhat higher frequencies by the maximum allowable piston velocity.

The method can be applied in contexts where different aspects of the source mechanism give rise to different constraints over different parts of the frequency spectrum. For example, a piston source will only be capable of a finite stroke, if only because of the finite length of the sound source, and usually its stroke will be much smaller than the length of the source. Some of the time derivatives of piston displacement will also usually be subject to constraints. With respect to piston velocity—the first derivative of displacement with respect to time—this parameter will typically be physically limited by the rate at which the piston seals can absorb frictional energy without damage. Piston acceleration (the second derivative of displacement) will typically be limited by the maximum force which the source can supply to drive the piston. The jerk (rate of change of acceleration) may be limited by energy loss to acoustic radiation. Analogous constraints apply to non-piston sources.

These multiple constraints taken together define an overall maximum source level as a function of frequency. Given this function, which will be determined from the properties of the device, the disclosed method can be applied as described above to create a sweep pattern that produces a desired output frequency spectrum in the minimum feasible time for a given controllable source. Alternatively, it can be used to create a spectrum with a desired frequency profile that has the maximum possible amplitude for a given sweep time.

It is an advantage of the instant approach that the source can be operated at or near maximum output power and still produce a spectrum with the preferred frequency profile. Thus the power output and the utility of the output signal can be simultaneously maximized mathematically. The total acoustic energy of the sweep is controlled by the time allowed to complete the sweep. In some embodiments the device may sweep for some length of time, and then pause before beginning the next sweep. In other embodiments, the device may emit sound continuously and the "time allowed to complete the sweep" may be chosen at intervals conveniently spaced in time. For example, the device might sweep up, then down, then up, etc., and the "individual sweeps" might be defined to begin and end at the turning points of the frequency.

The methods taught herein can be used in a variety of ways. In its simplest form, for a given desired output spectrum, and a given set of constraints as functions of frequency, the method finds the shortest possible sweep that produces the specified output spectrum. For a spectrum with a given frequency profile, the higher the overall amplitude of the output spectrum, and thus the greater the total energy required in the output sweep, the longer the sweep that will be required.

Often the total sweep time is limited. For example, for a marine source being towed by a moving vessel with a given velocity, the sweep may need to complete before the next "shot point" is reached. The time it takes the vessel to move the distance between adjacent shot points then constrains the maximum allowable sweep time. In such cases it may be desired to obtain a signal with a preferred spectrum frequency profile that has the maximal amplitude for the specified total sweep duration. In this case in another embodiment the method can be used iteratively to find the maximum possible amplitude of the output signal spectrum compatible with the physical capabilities of the source and corresponding to a sweep of the desired duration. In general the sweep duration will vary in proportion to the desired signal power spectrum's overall magnitude.

Similarly, in another embodiment the method may be used by iterative application to determine the maximum vessel speed compatible with producing an output sweep of the desired amplitude for a given source.

The method can also be used to correct for variation with frequency of the transmission of the signal through the environment. For example the signal transmitted into the subsurface by a marine seismic source is modified by the "ghost" reflection of its signal from the sea surface. This modification can be corrected by an application of the disclosed method in which the desired frequency profile is divided by the unwanted modification. This will produce a farfield signal spectrum with the desired profile.

Note, though, that design consideration limits the sweep to frequency ranges in which the surface ghost does not produce total extinction or near-extinction of the transmitted signal. It is well-known that such frequency ranges can be adjusted to include the desired frequency range of the source signal by operating the source at a suitable depth below the sea surface.

If a marine source's physical constraints vary with its operating depth, in another embodiment the method can be iteratively calculated for a range of depths (and thus constraints) to find the optimal operating depth for the source for a given desired farfield output spectrum. A wide variety of applications of the method to survey design are possible.

The method can also be used as a design tool by constructing a dynamical model of a proposed controllable source including all aspects of the design that may affect its output. The model is used to estimate the maximum output amplitude of the source as a function of frequency. The method can then be used to predict the minimum length of sweep that will be required to produce a desired output spectrum, and can further be used to estimate the impact of design changes on the sweep length so as to arrive at a design that produces the desired spectrum with a sweep not longer than a specified time.

If preferred, the method could be used in conjunction with experimental measurements of the source's maximum output as a function of frequency rather than with estimates based on a dynamical model. All that would be required to use the methods taught herein is a reliable estimate of source maximum output as a function of frequency, howsoever derived, and a desired output power spectrum. In some embodiments, the maximum output might be a function of both frequency and time, for example if the device periodically needs to be throttled back to allow heat to dissipate. Provided that the maximum output changes only slowly compared to the duration of a single sweep then the instant method may still be applied and will produce useful results, but it will need to be re-applied from time to time to re-calculate the optimal sweep as the maximum output changes. If the instant method is applied in cases where the maximum output is changing more rapidly than this then the calculated sweeps will be less close to being optimal. In some embodiments, the device might have sensors that would dynamically adjust the maximum output in real time, and the sweep rate would be calculated in real time based on the maximum output's currently determined value.

Turning now to FIG. 1, this figure contains a general overview of an embodiment and its associated environment. As is indicated, a seismic survey will be designed 110 according to methods well known to those of ordinary skill in the art. The survey might be, for example, a VSP (vertical seismic profile), land survey, marine survey, or some combination. Those of ordinary skill in the art will understand how surveys are designed and especially how such might be done where the object is to image a particular subsurface target.

As part of this process, algorithms 140 will be made available to a CPU 150, which might be any conventional or unconventional programmable computing device, and used to devise optimal source sweeps to be used in the survey design 110, as indicated by the arrow from box 150 back to box 110. The algorithms taught herein 140 may be stored on local or remote hard disk or other storage.

In the field, seismic data will be collected according to the survey design (block 120). This will typically involve positioning source and receivers at least approximately according to the design and recording source activations as is typically done. The recorded seismic waves (i.e., the seismic data) may (or may not) be subjected to some in-field processing before transmitting it on to a processing center where the bulk of the processing will typically take place.

Typically within a processing center some initial processing will be performed to associate each seismic recording with a surface or other location (block 130), although some aspects of this block might also have been performed in the field. In either case, a computer system 150, which might be a workstation, a server, a main frame, a parallel computer, a networked collection of computers or workstations, etc., will typically be engaged to process the data further in preparation for using it in exploration.

Next, the individual source or subarray activations will be identified and separated according to methods well known to those of ordinary skill in the art (e.g., via sparse inversion). Algorithms that do such a separation will typically be made available to a computer that is to utilize them via access to some amount of local or remote hard disk or other storage (item 145). Additional algorithms useful in the processing of seismic data will be similarly provided to the CPU 150 which might be any conventional or unconventional programmable computing device.

Conventionally, the seismic data will be processed and viewed on a computer display such as that of a workstation 170. Output from the seismic processing may be used to create maps or plots of seismic data and/or seismic attributes 180 according to methods well known to those of ordinary skill in the art.

In many instances the methods taught herein would be made a part of the survey design component of block 110 and then implemented when the survey is conducted (block 120).

Figure 2:
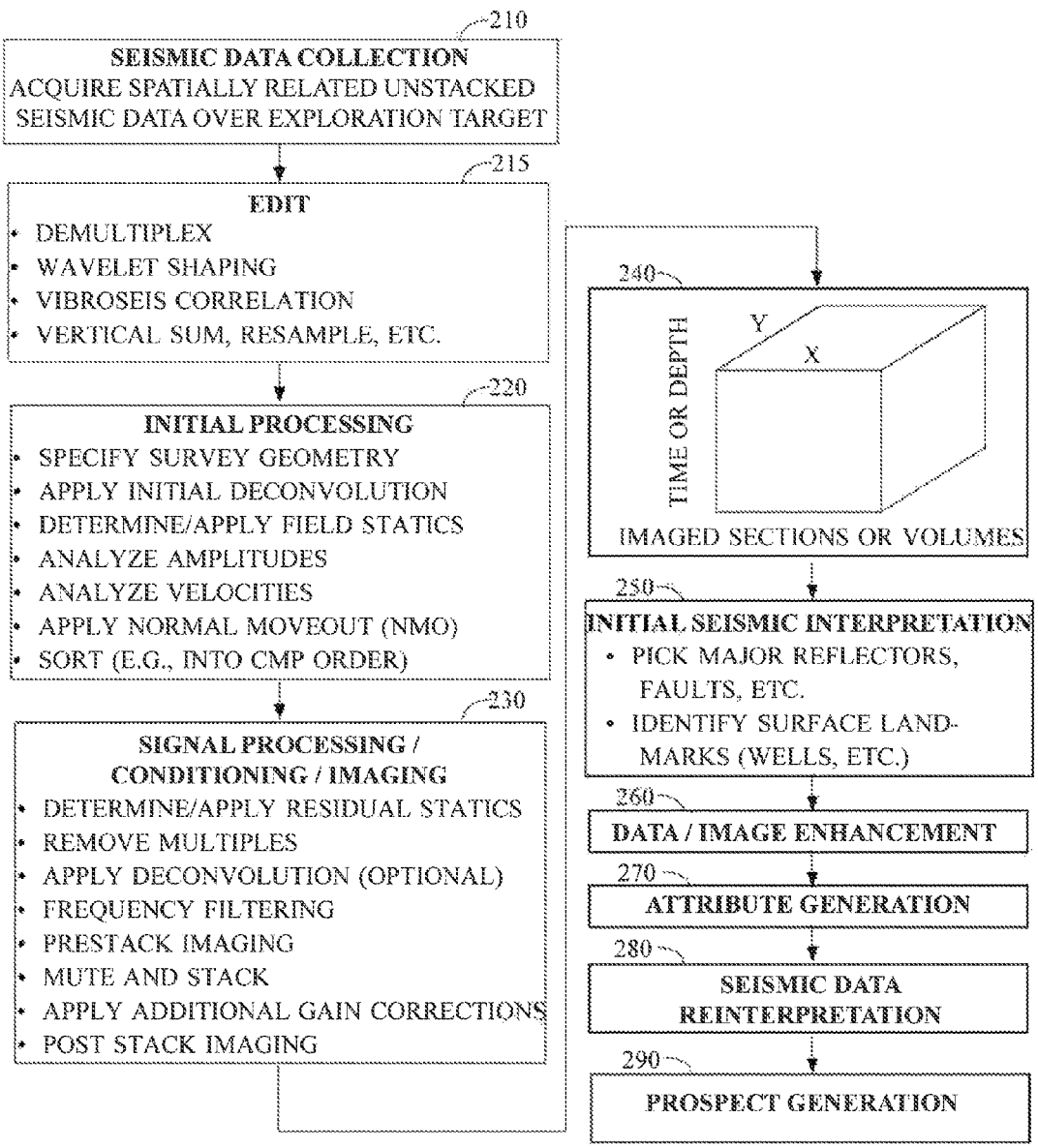
FIG. 2 contains an example processing sequence of the sort that might be utilized herein.

FIG. 2 contains additional details of a typical seismic processing sequence, consisting of seismic data collection 210, editing 215, some sort of initial processing 220, conditioning of the signal and imaging 230, production of imaged sections or volumes 240, initial interpretation of the seismic data 250, further image enhancement consistent with the exploration objectives 260, generation of attributes from the processed seismic data 270, reinterpretation of the seismic data as needed 280, and ultimately generation of a drilling prospect 290.

Figure 3:
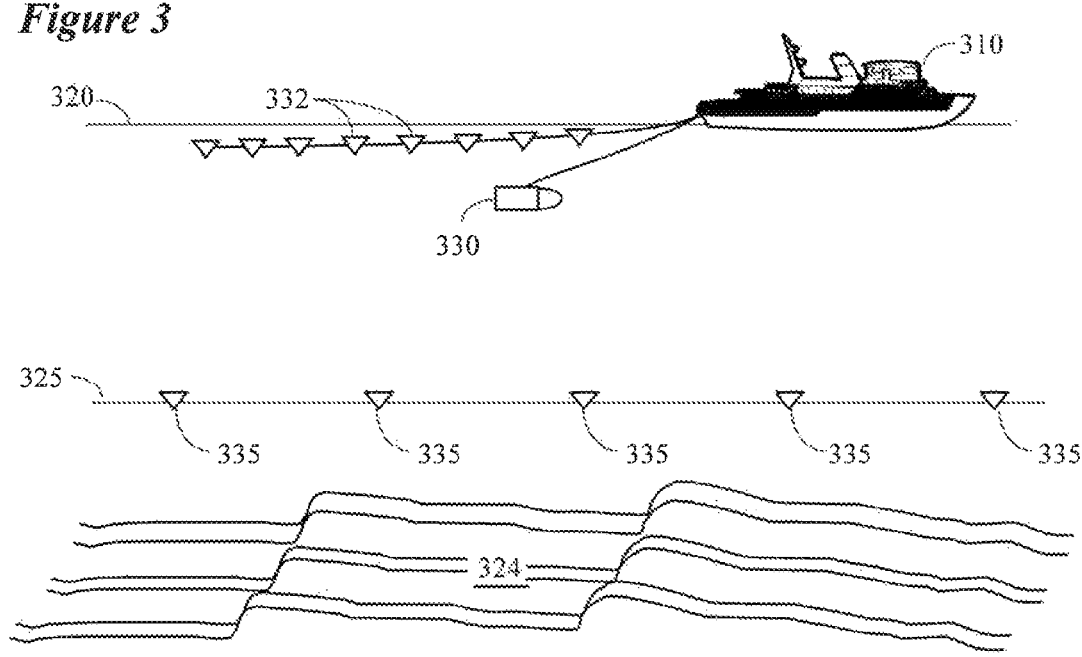
FIG. 3 illustrates an example marine environment.

With respect to FIG. 3, this figure contains an illustration of an embodiment as it might be practiced during the acquisition phase of seismic exploration. In an embodiment, at least one vessel 310 on a body of water 320 will tow one or more seismic resonators 330 (an illustrative example of a controllable seismic source) which will operate according to the principles discussed herein. In another embodiment (not shown) the one or more seismic resonators 330 might instead be towed by an autonomous underwater vehicle ("AUV"). In some embodiments, one or more seismic vessels 310 will tow some number of receiver sensors 332. In some embodiments, receivers 335 (e.g., ocean-bottom receivers) will be situated on the ocean floor 325. Wherever the receivers are located, in the water 320, on the ocean bottom 325, in boreholes below the ocean bottom (not shown), or any combination of these, a principal object is to obtain an image of the subsurface layer configuration 324.

Turning next to a discussion of some theoretical aspects, it can be shown that if a frequency sweep consists of an oscillating signal whose frequency varies slowly with time and is continuous and whose amplitude varies slowly compared to the period of oscillation, its energy spectrum at a given frequency is theoretically equal to twice the signal amplitude envelope squared divided by the rate of change of sweep angular frequency, both taken at the time at which the sweep passes through the given frequency. This can generally be expressed in the following equation:

$$|\overline{A}(\omega)|^2 = \frac{2\alpha(t_\omega)^2}{|\dot{\omega}_s(t_\omega)|}.$$

In this equation $\overline{A}(\omega)$ is the Fourier transform of the time history A(t) of the sweep signal, $\alpha(t_\omega)$ is the amplitude of the sweep signal at the time $t_\omega$ at which it passes through the angular frequency $\omega=2\pi f$, where f is frequency, and $\dot{\omega}_s(t_\omega)$ is the rate of change of the sweep's angular frequency $\omega_s$ at time $t_\omega$.

The time history of the sweep is given by:

$$A(t)=\alpha(t)\sin(\varphi(t)).$$

Here $\Phi(t)$ is a continuously increasing function of time after the start of the sweep, whose derivative is equal to the sweep frequency $\omega_s(t)$:

$$\omega_s(t) = \frac{d\varphi(t)}{dt}$$

and $$\dot{\omega}_s(t) = \frac{d^2 \varphi(t)}{dt^2}.$$

The choice of the specific quantity given by A(t), and the units in which it is measured, will depend on the type of source. A(t) should be chosen so that it is proportional to the amplitude of the observable acoustic field produced by the source:

$$P(t) = kA(t).$$

Here P(t) is the radiated acoustic field and k is a constant of proportionality converting the units. The equation for the spectrum of the acoustic field can then be written as:

$$|\overline{P}(\omega)|^2 = k^2 |\overline{A}(\omega)|^2.$$

While k in this expression could be chosen to use units such that k=1, it is often more convenient to represent A(t) using units that correspond to the physical dimensions of the sound source, and P(t) in standard units used for measuring acoustic power levels, and handling the units conversion as necessary in k. The parameter k could also be varied according to the convention that is used for representing a power spectrum: for example acousticians count both positive and negative frequencies, while the geophysical convention is to only consider the power in the positive frequencies when calculating a power spectral density for a seismic source. For some applications, the target spectrum is an energy spectrum, measuring the total energy in a sweep (the usual convention for geophysicists), but for other applications (for example, for a continuously emitting source) the target spectrum is a power spectrum, measuring energy per unit time (the usual convention for acousticians). The choice of units and the conventions used to represent the target spectrum will determine the appropriate units and value for k, according to methods well known to those of ordinary skill in the art.

In the case of a compact moving-piston marine source A(t) may, for example, be chosen to be the volume acceleration of the source. (A compact source is one whose physical dimensions are small compared to the wavelengths of its acoustic output.) For a moving-piston source V(t)=$A_p$x(t) is the volume of water displaced by the source, where $A_p$ is the cross-sectional area of the moving piston and x(t) is the piston's displacement as a function of time. Then, A(t) is chosen to be equal to the second derivative of the volume displacement with respect to time, i.e., A(t)=$\ddot{V}$(t)=$A_p\ddot{x}$(t), to which the amplitude of the observable acoustic pressure field produced by the source at a reference distance of 1 meter is proportional, with a constant of proportionality $$k = \left(\frac{\rho}{4\pi}\right),$$

where ρ is the density of the water.

This is the correct formula for a compact moving-piston marine source if $|\overline{P}(\omega)|^2$ is measured using consistent units, for example squared Pascals per squared Hertz at a reference distance of 1 meter if SI units are being used. If instead SI units were used for A(t) but microPascals (instead of Pascals) for P(t), to follow the acousticians' convention for measuring sound levels, then k would be $$k = 10^6 \left(\frac{\rho}{4\pi}\right)$$

in order to perform the desired units conversion.

To continue with this example, A(ω) can be written as $|\overline{A}(\omega)|^2 = (\omega^2 A_p)^2 |\overline{x}(\omega)|^2$, relating the Fourier transform of the displacement x to the output spectrum $|\overline{A}(\omega)|^2$.

In the case of a land vibrator source A(t) could be chosen to be the base plate acceleration, again a quantity to which the amplitude of the observable acoustic pressure field produced by the source at a fixed reference distance is proportional. In general the constant of proportionality k will depend on the type of source and the choice of units and conventions used to represent A(t) and P(t).

These equations form the basis of the instant approach. Heretofore efforts aimed at shaping the observable output acoustic spectrum of a vibrator or resonator have focused on the maximum displacement of the piston or baseplate. The instant approach, though, provides a much more general approach that takes into account multiple constraints, not just one, allowing a spectrum with a desired frequency profile to be produced more efficiently than has been heretofore possible.

The foregoing means that once the desired output spectrum $|\overline{A}(\omega)|^2$ has been specified, the quantities α(t) and Φ(t) that define the sweep A(t) that will produce the desired output spectrum may be calculated, in a manner to be discussed below.

If there were no constraints on the amplitude α($t_\omega$) to whose square the output spectrum $|\overline{A}(\omega)|^2$ is proportional, then the rate of change of frequency $\dot{\omega}_s(t_\omega)$ could simply be set to a constant value and α($t_\omega$) adjusted to obtain the desired value of $|\overline{A}(\omega)|^2$. This "linear sweep" methodology is commonly used in applications where the controlled seismic source has power to spare.

In practice, as has been explained, the source may not have power to spare, in which case α is constrained by the physical nature of the source and will be limited to some maximum value $\alpha_{max}(\omega)$ which may vary with frequency. If the goal is to produce as much power from the source as possible, intuitively the source should be operated at maximum power at all times. The defining equation then becomes:

$$|\overline{A}(\omega)|^2 = \frac{2\alpha_{max}^2(\omega)}{|\dot{\omega}_s(t_\omega)|}$$

This equation can be inverted to obtain a requirement on the sweep frequency:

$$|\dot{\omega}_s(t_\omega)| = \frac{2\alpha_{max}^2(\omega)}{|\overline{A}(\omega)|^2}$$

If the goal is to determine the minimal sweep time required to achieve a given observable acoustic spectrum $|\overline{P}(\omega)|^2$ (with a specified amplitude, not just a specified frequency profile), it is necessary to re-cast the previous equation in terms of the power spectrum of the observable acoustic signal using the previously introduced constant of proportionality k. The equation for $\dot{\omega}_s(t_\omega)$ can then be re-cast in a form that relates it directly to the desired observable acoustic spectrum. This equation can now be rewritten explicitly as a differential equation to be solved for ω(t):

$$|\dot{\omega}(t)| = (k)^2 \frac{2\alpha_{max}^2(\omega(t))}{|\overline{P}(\omega(t))|^2}$$

An analogous procedure can be followed for any type of acoustic source, so that $\dot{\omega}_s(t_\omega)$ may be calculated directly from knowledge of $\alpha_{max}(\omega)$ and the desired power spectrum of the observable acoustic signal. Note although $\alpha_{max}(\omega)$ is written as a function of frequency, in some embodiments it might also be a slowly-varying function of time, $\alpha_{max}(\omega(t), t)$. This situation may arise for example if the temperature of the source rises slowly with time, requiring its maximum output amplitude to be reduced. Provided that the rate of change of $\alpha_{max}(\omega(t),t)$ with time is slow, specifically if the change in $\alpha_{max}(\omega(t),t)$ over the course of a single sweep is negligible, the instant method can still be applied with the proviso that the function ω(t) will need to be re-calculated from time to time. In the more general case that $\alpha_{max}(\omega(t),t)$ changes more rapidly with time the algorithm is no longer guaranteed to produce optimal sweeps, because overall performance might be increased by running the device at less than the maximum amplitude at some points in the sweep (i.e., $\alpha_{max}(\omega)$ could be scaled back at some points in the sweep). However, in this case the method can still usefully be used to calculate trial sweeps for a variety of scaled-back $\alpha_{max}(\omega)$.

For some simple functions $\alpha_{max}(\omega)$ this equation may admit to an analytical solution for ω(t). More generally, an approximate numerical solution can be obtained by:
1. Choosing a beginning frequency $\omega_B(t)$ and an ending frequency $\omega_E(t)$ for the sweep;
2. Setting $\omega=\omega_B$ and t=0;
3. Stepping forward time t, numerically integrating $\dot{\omega}(t)$ to obtain ω(t), at each iteration then using the current value of ω(t) to evaluate $\alpha^2(t)=\alpha_{max}^2(t)=\alpha_{max}^2(\omega(t))$ and $|\overline{P}(t)|^2=|\overline{P}(\omega(t))|^2$;
4. Stopping the integration when $\omega_s=\omega_E$, and saving the ending time $t_E=t$.
5. If desired, ω(t) could be integrated over time from t=0 to t=$t_E$, obtaining Φ(t), which together with α(t) then specifies the complete sweep A(t)=α(t)sin(Φ(t)).

The starting value of Φ(t=0) may be chosen to define the initial position of the source. More accurate numerical methods (well known to those skilled in the art of finding numerical solutions of differential equations) may also be used to solve this equation, for example Runge-Kutta or quadrature methods. The methodology trivially generalizes to the case of downsweeps, and to devices for which $\alpha_{max}^2(\omega,t)$ might also vary with time in the sweep. The ending time t=$t_E$ gives the minimum sweep time required to produce the desired output spectrum for this source.

Of course, the source could be operated at less than maximum power if desired, but the sweep time to produce the same output spectrum must then increase. The optimal sweeps for these cases can be calculated by simply by choosing a more conservative $\alpha_{max}^2(\omega)$.

If $|\overline{P}(\omega)|^2$ represents a desired frequency profile, i.e. a desired relative spectral shape instead of an absolute power spectral density level, then k can be written as k=$k_v k_u$, where $k_u$ converts units as before, and $k_v$ is a "volume control knob". The quantity $k_v$ can be varied to produce a menu of sweeps at different amplitude levels, each producing the desired frequency profile, but over a range of possible sweep lengths $t_E(k_v)$.

If all else stays the same, in this case the sweep time will scale as the inverse of the square of $k_v$, i.e., $$t_E(k_v) \propto \frac{1}{k_v^2},$$

so it is possible to directly solve for the value of $k_v$ that will produce any desired $t_E$ after only one initial iteration. In some embodiments, $\alpha_{max}^2(\omega)$ might also depend on the time in the sweep (for example, if the device heats up during a sweep, changing its properties) in which case iterative solution over many trial values of $k_v$ to find a sweep that stays just within a desired sweep time limit $t_{max}$ may be necessary, i.e. to find $k_v$ such that $t_E(k_v)<t_{max}$.

Figure 5:
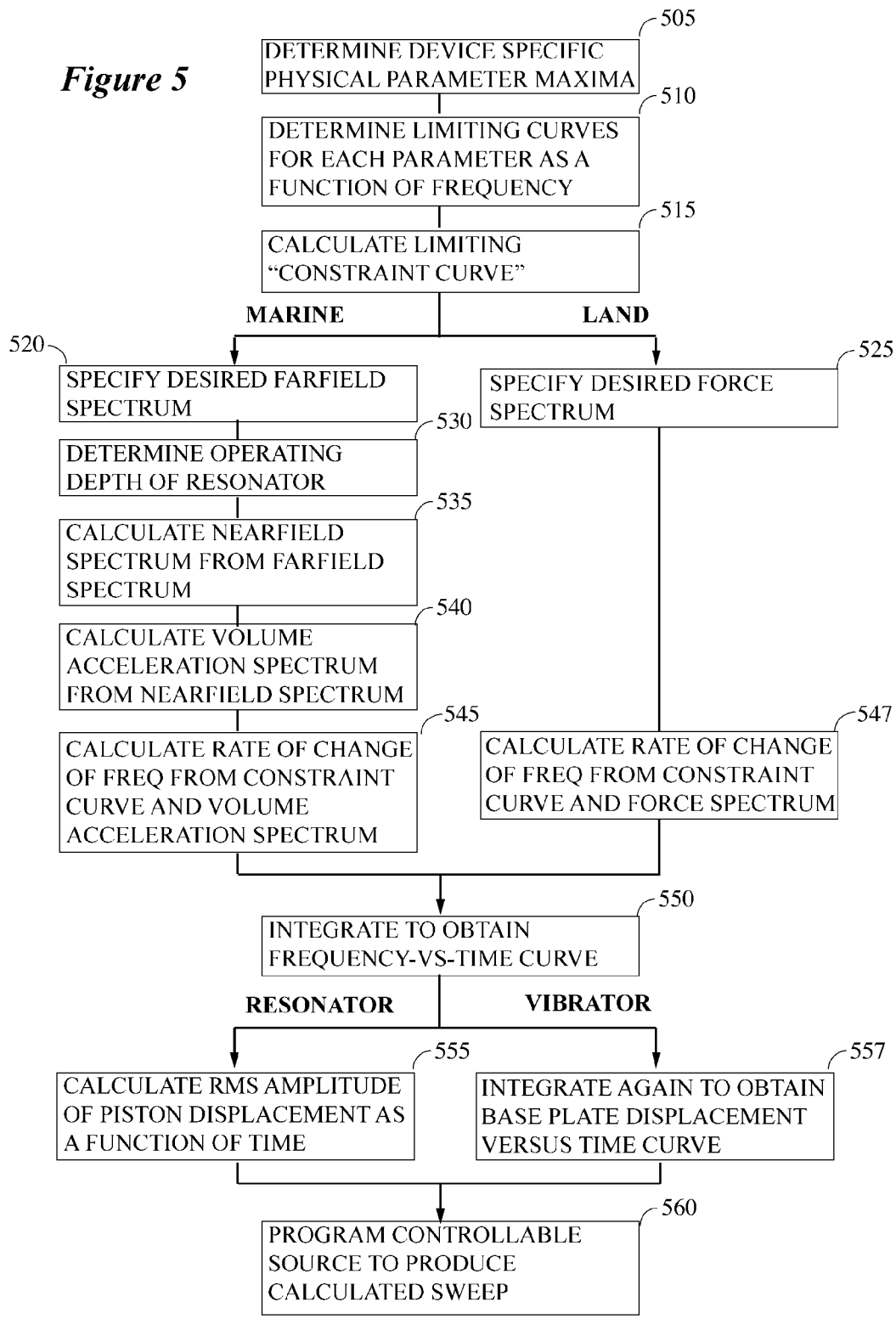
FIG. 5 contains an illustration of an operating logic.

Turning to FIG. 5, in this figure is displayed an operating logic suitable for use with an embodiment as it might be implemented in practice. It should be noted and remembered that although this particular embodiment is discussed in connection with a marine piston resonator, this same general approach could be used to design an optimal or near optimal sweep for a marine vibrator or land vibrator, or more generally any controlled-frequency sweeping source.

According to this embodiment, certain physical parameters of the piston will be specified (block 505). It has been advantageous to specify at least the maximum piston displacement that is possible (or advisable, allowable, desirable, etc.) for a particular controllable source. Additionally, in this embodiment the maximum possible (or advisable, allowable, desirable, etc.) velocity and acceleration of the piston will also be specified. Finally, and this is optional in many instances, the maximum possible (or advisable, allowable, desirable, etc.) time derivative of acceleration (conventionally the "jerk") may be specified. This last parameter is optional in many instances because it may never come into play as a limitation, depending on the particular resonator involved and the values of the other parameters selected above.

Next, in this embodiment the selected parameter values from block 505 will be used to determine limiting curves for this resonator as a function of frequency (block 510). For this example the constraints are quantified in terms of the source volume acceleration $\ddot{V}(\omega)$ because this is a quantity that is easily calculated for a marine piston source, and has already been explained, it is proportional to the radiated acoustic pressure. Volume acceleration is related to source displacement x, velocity v, acceleration a, and jerk j via the piston area $A_p$ as follows:

Displacement $\ddot{V}(\omega) = A_p \omega^2 x(\omega)$

Velocity: $\ddot{V}(\omega) = A_p \omega v(\omega)$

Acceleration: $\ddot{V}(\omega) = A_p a(\omega)$

Jerk: $\ddot{V}(\omega) = A_p \frac{j(\omega)}{\omega}$

Figure 6:
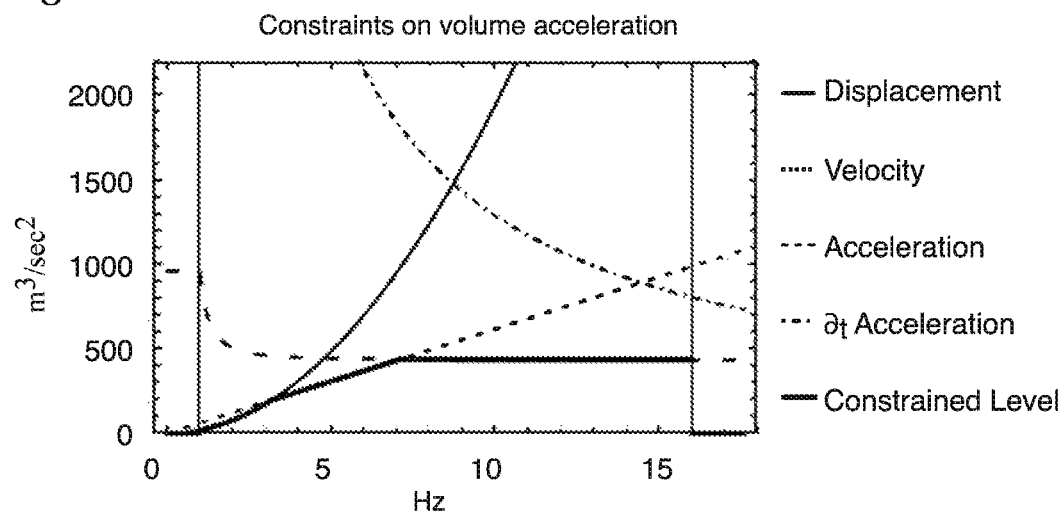
FIG. 6 illustrates how multiple physical constraints can operate to limit the motion of the piston over various frequency intervals in a marine resonator case.

FIG. 6 shows these four constraint curves for a hypothetical marine piston resonator. As can be seen, there is a curve corresponding to each of displacement, velocity, acceleration, and jerk. For purposes of the instant disclosure, these curves will be referred to as "limit curves", one each for displacement ("displacement limit curve"), velocity ("velocity limit curve"), acceleration ("acceleration limit curve") and, optionally, jerk ("jerk limit curve"). For this example the limiting values of displacement, velocity, and jerk are constants that do not depend on frequency (i.e. they are constant functions of $\omega$), but the limit on the acceleration does depend on frequency. In other embodiments the limiting values of acceleration may be constant with frequency, or all four limiting values may vary with frequency. In other embodiments any or all of the limit curves may themselves result from a combination of two or more constraints. In fact for this example device there are two acceleration constraints, one constant with frequency and the other not. The acceleration limit curve plotted in FIG. 6 follows the minimum of these two constraints. In other embodiments there may be more than four limit curves, or less than four limit curves, depending on the specifics of the particular device. The minimum of all of the limit curves taken together supplies the value $\alpha_{max}(\omega)$ introduced supra.

Next, the limiting curves calculated in block 510 will be used to determine the sweep constraints that are appropriate for this particular resonator (block 515). The curves in FIG. 6 provide an example of one way this might be done. In this example, the heavy line associated with the "Constrained Level" curve has been chosen to follow the curve that has the minimum value for a given frequency (a "constrained level curve" or "constraint curve", hereinafter). The result is a continuous curve that defines at each frequency the limiting value of $\alpha_{max}(\omega)$, the Fourier-transformed volume acceleration to be used in the equation presented previously to define the sweep signal.

If this is a marine case, in this embodiment the desired farfield power spectrum $|\overline{P}_{farfield}(\omega)|^2$ will be specified (block 520), between starting and ending sweep frequencies $\omega_B$ and $\omega_E$. This might be any spectral shape and, for example, might be constant across the chosen frequency band of the signal, i.e., a flat spectrum.

In this embodiment and continuing with the discussion of a marine resonator, next the operating depth in the water of the resonator will be selected (block 530). Although this contemplates that this embodiment will be operating in a marine environment, as is discussed more fully below, that assumption has been made here only for purposes of specificity in discussing this particular example.

Next, in an embodiment the required nearfield spectrum normalized to a reference distance of 1 meter, $|\overline{P}_{1m}(\omega)|^2$, will be calculated from the desired farfield spectrum and the chosen operating depth. This can be done according to methods well known to those of ordinary skill in the art. That being said, one way of making this calculation is as follows. If the source is at depth d and the speed of sound in water is c then the effect of the "ghost" reflection from the water surface is to modify the spectral amplitude in the far field such that $$2\left(1 - \cos\frac{2\omega d}{c}\right) = \frac{|\overline{P}_{farfield}(\omega)|^2}{|\overline{P}_{1m}(\omega)|^2}.$$

If the desired range of nonzero farfield frequencies includes any at which this propagation factor is zero or nearly zero, the operating depth of the source d or the frequency range of the sweep needs to be rechosen. The required nearfield power spectrum can then be calculated in this embodiment as follows, block 535:

$$|\overline{P}_{1m}(\omega)|^2 = \frac{|\overline{P}_{farfield}(\omega)|^2}{2\left(1 - \cos\frac{2\omega d}{c}\right)}.$$

In this example the output spectrum $|\overline{A}(\omega)|^2$ was chosen to be proportional to the nearfield acoustic spectrum $|\overline{P}_{1m}(\omega)|^2$, so that $|\overline{P}_{1m}(\omega)|^2 = k^2|\overline{A}(\omega)|^2$. For this example, with $A(t)=\ddot{V}(t)$, $$k = \left(\frac{\rho}{4\pi}\right),$$

where $\rho$ is the density of the water and assuming a consistent choice of units for $\overline{P}_{1m}(\omega)$ and $\overline{A}(\omega)$. The nearfield acoustic spectrum can then be converted to the required volume acceleration spectrum through the equation that follows:

$$|\overline{A}(\omega)|^2 = |\overline{P}_{1m}(\omega)|^2/k^2$$

(block 540).

Returning now to the "LAND" branch of FIG. 5, in the event that the instant method is being applied to a land (vibroseis) case, the desired force spectrum will need to be specified (block 525). Additional details can be found below.

Given the foregoing, the elements specified above can be used to calculate how the sweep frequency should vary with time. The formula is the same regardless of whether the rate of change of frequency is calculated from the volume acceleration spectrum for the marine case (block 545) or the force spectrum for the land case (block 547):

$$|\dot{\omega}(t)| = \frac{2\alpha_{max}^2(\omega(t))}{|\overline{A}(\omega(t))|^2}.$$

Continuing with this example, in some embodiments the previous differential equation can be integrated with respect to time to obtain a frequency versus time expression $\omega(t)$ (block 550).

For the piston source being considered (i.e., the "RESONATOR" branch), the equations $$|\overline{A}(\omega)|^2 = \frac{2\alpha_{max}^2(\omega)}{|\dot{\omega}(t)|} \text{ and } |\overline{A}(\omega)|^2 = (\omega^2 A_p)^2|\overline{x}(\omega)|^2$$

can be used to solve for the corresponding RMS amplitude of the piston motion as a function of time (block 555):

$$|\overline{x}(\omega)| = \frac{\sqrt{2}\,\alpha_{max}(\omega)}{\sqrt{|\dot{\omega}(t)|}\,(\omega^2 A_p)}.$$

For the example of a freely oscillating piston resonator, this is enough: in this embodiment the device is operated at its maximum permissible RMS amplitude $|\overline{x}(\omega(t))|$ as the resonant frequency of the device is adjusted with time according to $\omega(t)$.

In other embodiments $$\omega(t) = \frac{d\phi(t)}{dt}$$

could be integrated to obtain Φ(t), and then A(t)=α(t) sin(Φ(t)) with α(t)=α$_{max}$(ω(t)) could be used to determine the sweep A(t) (i.e., block 557 under the "VIBRATOR" branch of FIG. 5).

In practice other methods could be used to calculate the initial ramp-up and final ramp-down phases of the sweep, with this variation being used for the body of the sweep in between.

Finally, it is anticipated that the sweep obtained previously will be used to control a controllable seismic source as part of seismic survey aimed at imaging some portion of the subsurface of the earth (block 560).

EXAMPLES

Two examples of applications of the method as applied to two different sources will now be given by way of illustration of its use to design sweeps subject to physical constraints imposed by the source. The first example relates to a land vibrator; the second to a marine piston source.

In the first example a land vibrator will be chosen that has the published characteristics of the University of Texas' "Liquidator" low-frequency vibrator:

| | |
|---|---|
| Reaction mass: | 3575 kg |
| Max relative displacement: | ±0.2 m |
| Max force: | 89 kN |

For purposes of illustration, the following parameters will be utilized:

| | |
|---|---|
| Max relative velocity: | 3 m/s |
| Internal impedance: | 30,000 Ns/m |
| Max permissible force across internal impedance: | 10,000 N |
| Piston mass: | 1000 kg |
| Ground impedance: | 106 Ns/m. |

Figure 7:
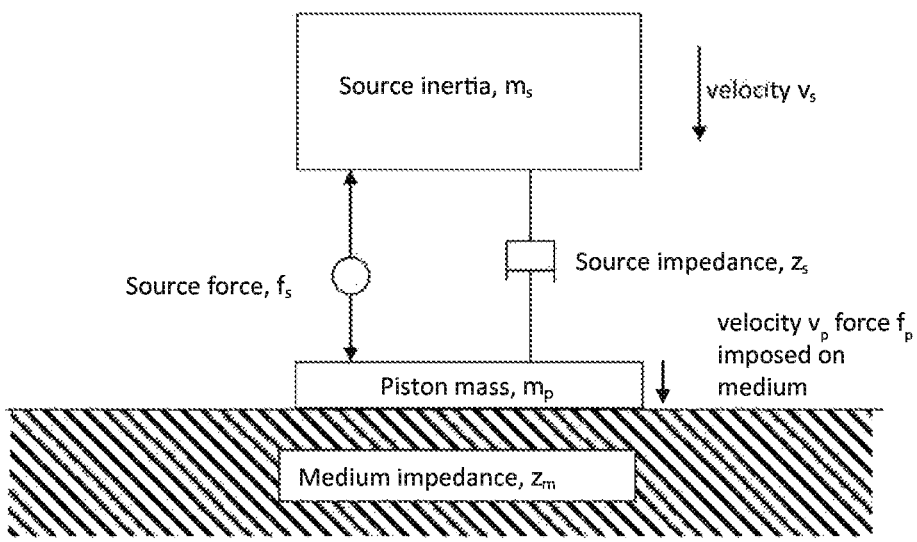
FIG. 7 illustrates one example configuration of a device that would be suitable for control according to the methods taught herein.

A schematic sketch of a representative system is given in FIG. 7. The example of this figure may be described as "single-ended" because only its piston is in contact with the medium in which the signal is to propagate (the earth). The body provides an inertial reaction mass.

This example will be couched in terms of the piston velocity rather than the volume acceleration that has been used for illustrative purposes in the previous equations. This is partly because the volume-acceleration measure is not generally appropriate for a land source, for which the piston area is not as important as it is for a marine source. It also means that the parameters of the system can be described directly in terms of mechanical impedance, that is to say the ratio of applied force to resulting velocity at any given frequency. The constraints graph associated with this example is accordingly shown with the y-axis calibrated in terms of ground plate velocity in FIG. 8.

Assuming the parameters selected above, this figure shows the source to be displacement-limited up to about 7 rad/sec ("x constraint"), then constrained by the maximum force its internal impedance can support up to around 17 rad/sec ("fz constraint"). Above this point it is constrained by the maximum force the hydraulics can provide ("fs constraint"). The peak output is close to the force actuator's maximum force; above about 1000 rad/sec it begins to decrease as the base-plate inertia comes into play.

Figure 8:
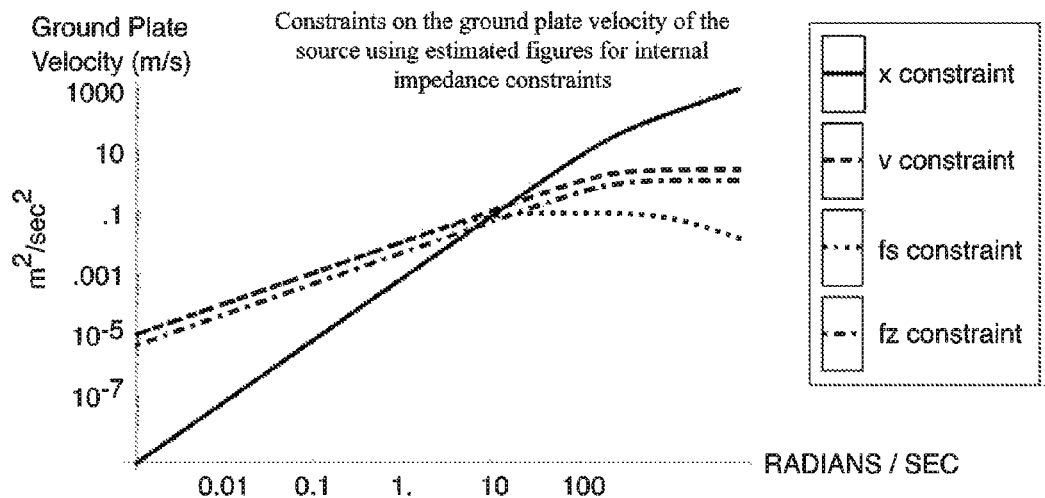
FIG. 8 illustrates constraints on the ground plate velocity for the example of FIG. 7 for internal impedance constraints.

The curve of FIG. 8 has several notable characteristics. The velocity constraint is not simply a horizontal line in this example. This is because, while the constraint graph measures ground plate velocity, the constraint itself is on piston (base-plate) velocity relative to the actuator body, rather than on piston velocity itself. At low frequencies the medium impedance is higher than the actuator inertia and the actuator moves without moving the medium very much. However, as frequency increases, so does inertial impedance, and consequently the motion imposed on the medium increases. Thus at the highest frequencies the velocity constraint does become a horizontal line.

Additionally, in this example the internal-force ("fz") constraint runs parallel to the velocity constraint. This is because both depend directly on relative velocity (and are therefore in a fixed proportion). The absolute level of the internal-force constraint is an estimate: it will move up or down if the permissible internal force is increased or decreased, or if the estimated internal impedance is decreased or increased.

Let the velocity constraint envelope be denoted v$_{max}$. The desired sweep will now be defined as the time history obeying v$_{max}$ that gives a required force spectrum $|\bar{f}_p(\omega)|$ in the medium. For land sources output is typically defined in terms of ground-plate force applied to the Earth, not farfield acoustic pressure, so the conversion factor k is not needed for this example, or alternatively, k=1 for this example. The function $|\bar{f}_p(\omega)|$ is related to piston velocity v$_p$(ω) and ground impedance z$_m$(ω) by the equation:

$$|\bar{f}_p(\omega)|=\sqrt{2}v_p(\omega)z_m(\omega).$$

From the equations given previously, and bearing in mind that ground force is taking the place of volume acceleration, it follows that:

$$|\bar{f}_p(\omega)| = \sqrt{2} \frac{v_{max}(\omega(t_\omega))z_m(\omega(t_\omega))}{\sqrt{\dot{\omega}(t_\omega)}}.$$

Here t$_ω$ is the time at which the sweep frequency passes through ω, $|\bar{f}_p(\omega)|$ is the spectrum of the force input to the ground, and v$_{max}$(ω) is the maximum desired value of piston velocity at angular frequency ω.

An optimum sweep for this example can now be designed. The rate of change of frequency can be extracted and solved for to yield:

$$\dot{\omega}(t_\omega) = 2\left(\frac{|v_{max}(\omega(t_\omega))z_m(\omega(t_\omega))|}{|\bar{f}_p(\omega)|}\right)^2$$

Given the previous expression, numerical quadrature is one method of calculating frequency as a function of time in the manner previously described as applied to this embodiment.

Figure 9:
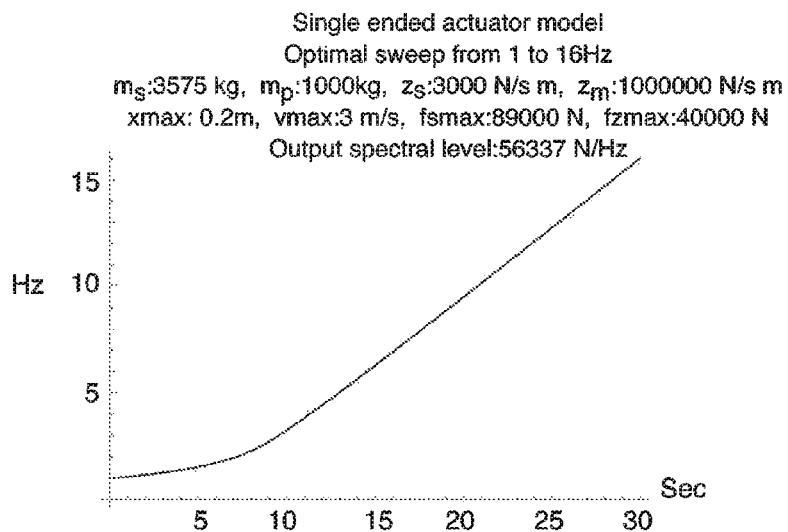
FIG. 9 illustrates the frequency profile of a sweep calculated for the device of FIG. 7.

For a flat spectrum over 1-16 Hz for a force spectrum applied to the ground of 56 kN/Hz, numerical quadrature gives the graph of frequency vs. sweep time shown in FIG. 9.

Figure 10:
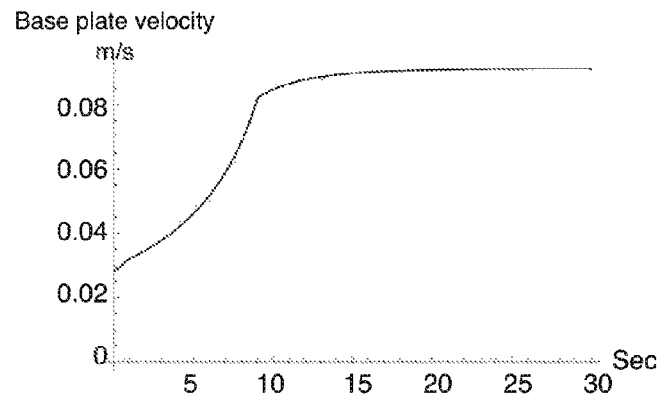
FIG. 10 illustrates baseplate peak velocity as a function of time according to the example of FIG. 7.
Figure 11:
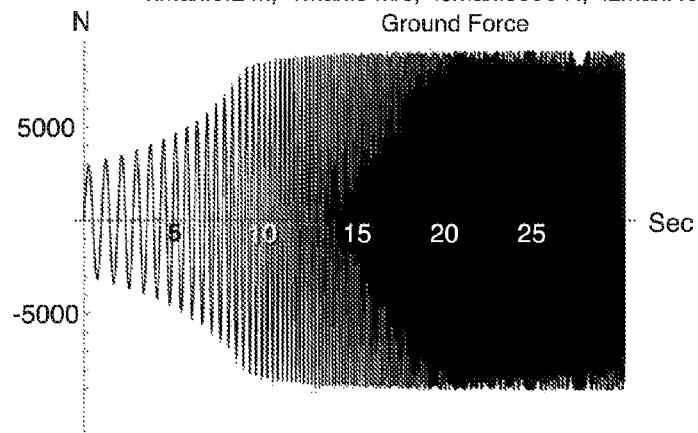
FIG. 11 illustrates an optimal sweep calculated according to one variation of the device of FIG. 7.
Figure 12:
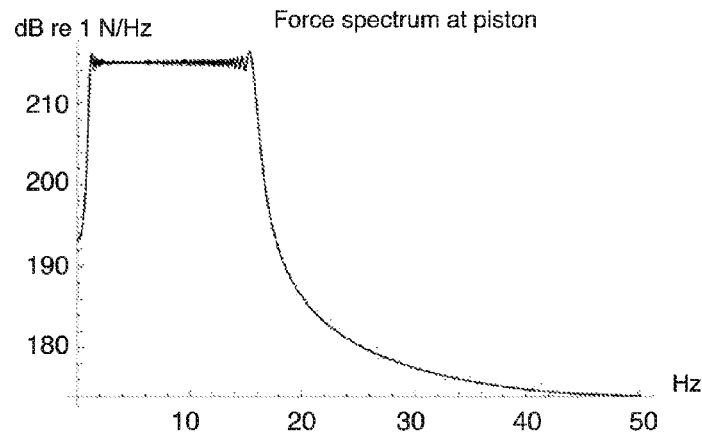
FIG. 12 illustrates the force spectrum at the piston for the device of FIG. 7.

The base-plate velocity vs. time for this example is shown in FIG. 10. The time history of ground force assuming a starting phase of zero is shown in FIG. 11. Finally the force spectrum calculated numerically from this sweep is shown in FIG. 12. It is flat, as intended, but with ripples at the band edges. These manifestations of the Gibbs effect that are evident in this example are produced by the abrupt start and end of the sweep and can be reduced by suitable amplitude ramps in the manner known to those versed in the art.

Figure 13:
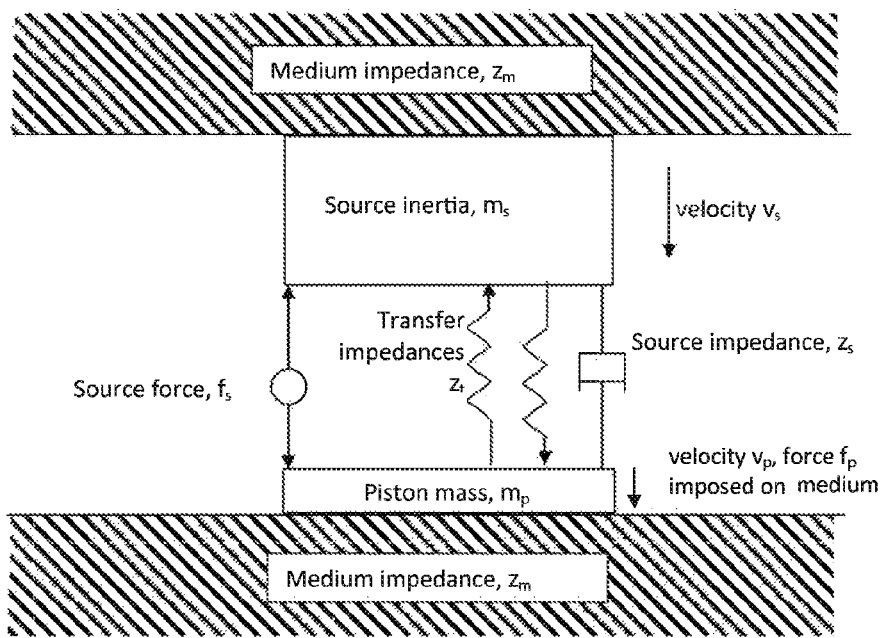
FIG. 13 contains an illustration of an example of a double ended source.

In the second example, a marine resonant source in which the resonant internal dynamics provide most of the force on its piston is modeled. This example will be referred to a "double-ended source" because both the piston and the body of the device are in contact with the water and may contribute to the output signal. As well as the direct effect of the piston and body on the medium, this example gives rise to a transfer impedance between the two ends: the piston velocity produces a force on the body, and the body velocity produces a force on the piston. A sketch of its significant components appears in FIG. 13.

The source for this example may be modeled using the following parameters.

| | |
|---|---|
| Source mass: | 15,000 kg |
| Piston mass: | 4,000 kg |
| Max relative displacement: | ±0.1 m |
| Max relative velocity: | 2 m/s |
| Max actuator force: | 12 kN |
| Max permissible force across internal impedance: | 280 kN (across tuneable part only - see below) |

Medium impedance for this example is set equal to the low-frequency impedance of the piston, plus a small addition for fluid drag.

Transfer impedance is modeled as a small proportion (0.1) of piston impedance with the addition of 2% proportional damping for purposes of illustration.

In this example, the internal impedance $z_s$ is modeled as two springs in parallel, one having fixed stiffness, the other having variable stiffness and tuneable so that the resonant frequency of the source can be controlled to follow the desired frequency/time profile. The maximum piston acceleration is set by the largest force that the springs supporting it can tolerate. The fixed-stiffness spring has a larger force-bearing capacity then the variable-stiffness spring; consequently larger accelerations can be tolerated at low frequencies, where the fixed spring bears most of the force required to accelerate the piston. In consequence the acceleration constraint is not constant with frequency.

This embodiment will now be applied to obtain a sweep that will produce a flat spectrum in the far field between the frequencies of 3 Hz and 50 Hz, and to deduce its minimum duration.

Figure 14:
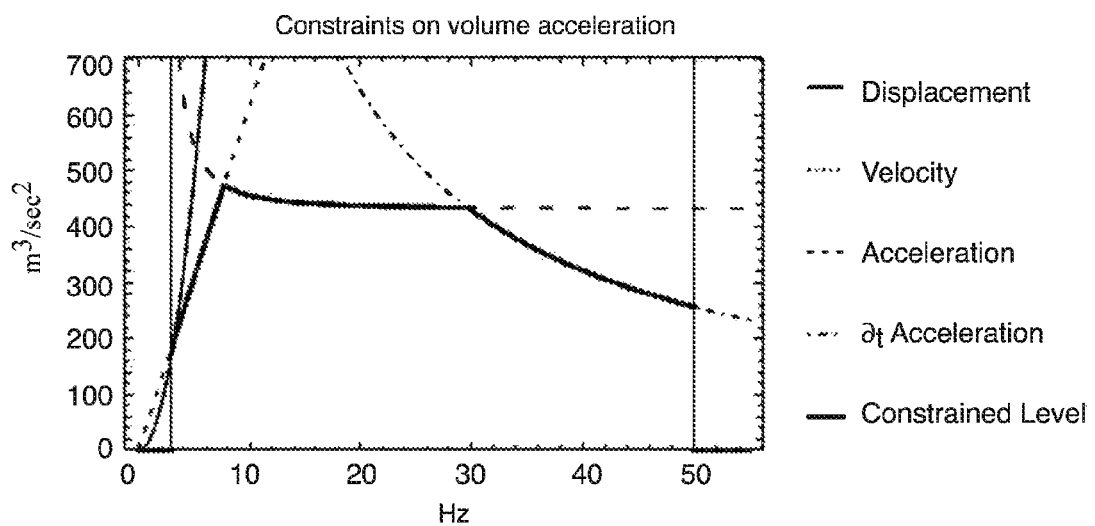
FIG. 14 illustrates constraints on volume acceleration for the embodiment of FIG. 13.

The constraints graph for this example is shown in FIG. 14. The y-axis measures volume acceleration, as used in FIG. 6: those of ordinary skill in the art will recognize that the choice is one of convenience. It is only necessary that the variable used as a constraint can be related to the relevant constrained properties of motion in the model, and that the scaling factor and the observable output signal is known. This constraint graph looks very different to the single-ended case. It is an advantage o that it can be applied equally readily to acoustic sources of both single- and double-ended types.

The model will now be used to calculate the sweep that gives a flat spectrum in the far field of 200 dB referenced to 1 microPascal per Hertz at 1 meter. This entails adjusting the sweep to allow for the distortions introduced by the sea surface "ghost" reflection as described previously. If the volume acceleration is expressed in terms of piston acceleration $\alpha$, and the target spectrum in terms of the farfield pressure spectrum $\overline{P}_{farfield}(\omega)$, it is straightforward to obtain the equation governing the optimum sweep profile from equations given previously:

$$\overline{A}(\omega) = \overline{V}(\omega) = \overline{\alpha}(\omega) = A_p \overline{a}(\omega),$$

$$|\overline{A}(\omega)| = |\overline{P}_{1m}(\omega)|/k$$

$$k = 10^6 \left(\frac{\rho}{4\pi}\right),$$

$$|\overline{P}_{1m}(\omega)|^2 = \frac{|\overline{P}_{farfield}(\omega)|^2}{2\left(1 - \cos\frac{2\omega d}{c}\right)}, \text{ and}$$

$$|\dot{\omega}(t)| = \frac{2\alpha_{max}^2(\omega(t))}{|\overline{A}(\omega(t))|^2}, \text{ so that}$$

$$|\dot{\omega}(t)| = 4\left(1 - \cos\frac{2\omega(t)d}{c}\right)\left(kA_p \frac{a_{max}(\omega(t))}{|\overline{P}_{farfield}(\omega(t))|}\right)^2$$

where d is the source depth, and $\alpha_{max}(\omega)$ is the maximum desired piston acceleration at angular frequency $\omega$. Here the factor of $10^6$ in k is necessary because of the (inconsistent) choice of units: SI units for $\overline{A}(\omega)$, but microPascals per Hertz for $\overline{P}_{1m}(\omega)$.

As before, in this example numerical integration will be used to calculate frequency as a function of time to produce a sweep from 3 Hz to 50 Hz which is a suitable range to illustrate the effects of constraints on displacement, velocity and acceleration.

Figure 15:
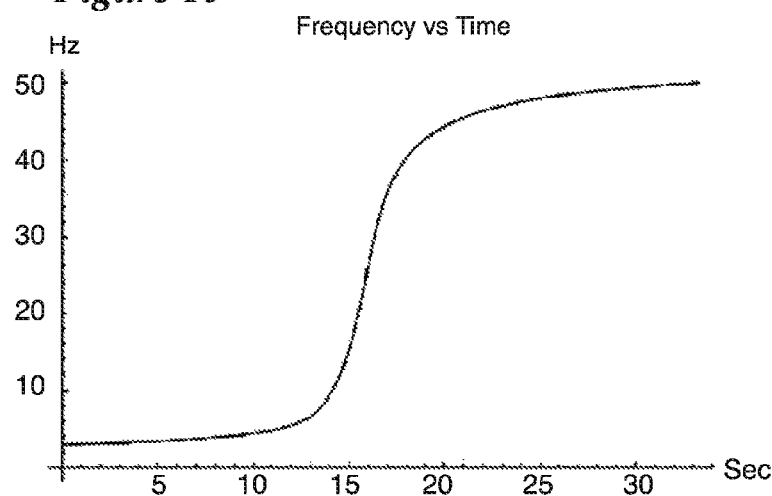
FIG. 15 illustrates the frequency profile of an optimal sweep from 3 to 16 Hz determined according to an embodiment (frequency vs. time).
Figure 16:
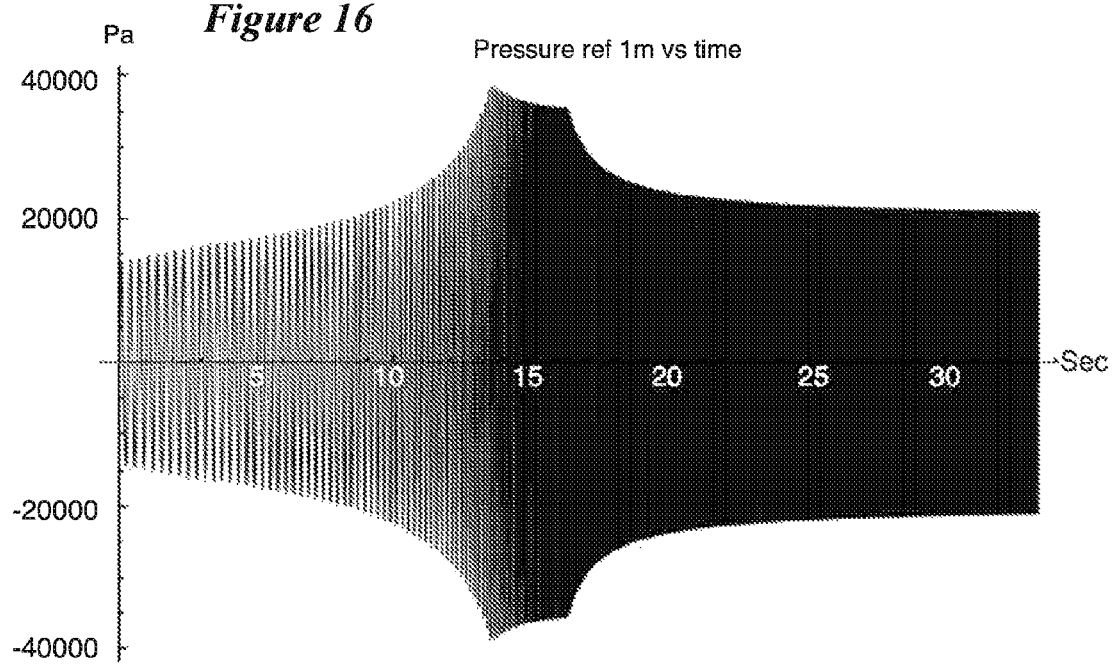
FIG. 16 contains an illustration of pressure at 1 meter versus time from 3 to 16 Hz for the optimal sweep as it pertains to the example of FIG. 13.
Figure 17:
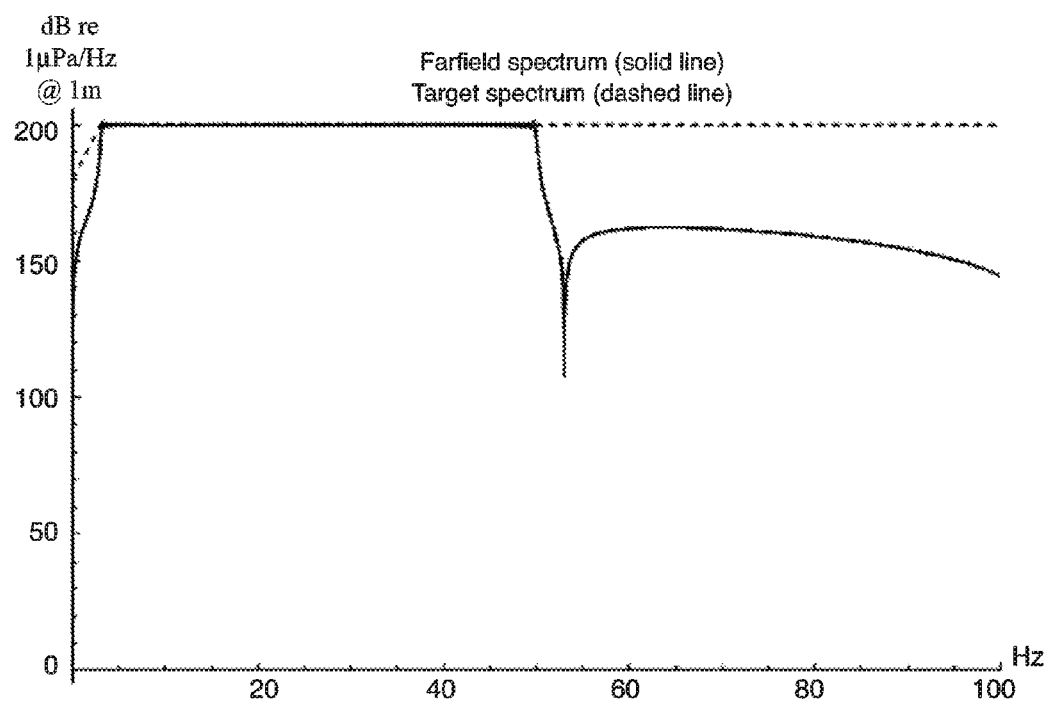
FIG. 17 illustrates a far field pressure spectrum for the example of FIG. 13 shown compared to a desired target spectrum level.

Frequency as a function of time is shown in FIG. 15 for this example. It is evident that the sweep duration has to be about 34 seconds to achieve the desired output spectrum. Pressure referred to 1 m vs. time is shown in FIG. 16. The far field spectrum is shown in FIG. 17, compared to a target level of 200 dB shown as a broken line. The farfield spectrum is flat, as intended, except for windowing ripples near the band edges. The Gibbs Effect is also at least partially responsible for the non-zero spectral amplitudes at higher frequencies in this example, which are modulated by the effect of the sea surface ghost reflection.

Figure 4:
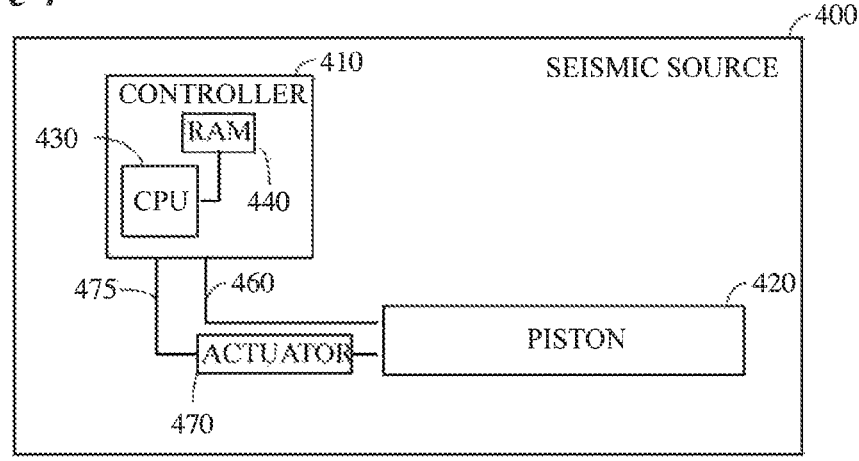
FIG. 4 contains a schematic of a hardware embodiment.

Finally, and turning now to FIG. 4, according to still another embodiment there is provided a controllable swept-frequency seismic source that is designed to be operated as taught herein. Note that, as is explained more fully below, the embodiment of this figure is intended to represent, in a general way, both vibrating (land or marine) and resonating (marine) sources. In the embodiment of this figure, the source 400 will contain at minimum a piston 420 and a controller 410 that controls the operation of the piston. Typically, the controller will contain at least a CPU 430 of some sort (e.g., a microprocessor, microcontroller, gate array, or other programmable logic device) and some amount of memory 440 (volatile or nonvolatile) accessible by the CPU 430 that will typically be used to contain a sweep schedule that has been determined according to the methods discussed herein. Note that the memory 440 might be external to, or internal to, the CPU 430. In operation, the controller 410 will control the operation of the radiating piston 420 during its designed sweep according to methods well known to those of ordinary skill in the art. Additionally provided in this example are a variable spring control line 460, which allows the controller 410 to vary the resonant frequency of the radiating piston 420, and an actuator 470 and its associated actuator control line 475 which will allow the envelope of the displacement of the piston 420 to be controlled.

Note that although the foregoing has been discussed in terms of resonator, those of ordinary skill in the art will understand how the example of FIG. 4 could be modified to represent a land or marine vibrator. In the case of a vibrator, this diagram can be modified to represent same by eliminating the variable spring control line 460. Note that in the case of a resonator, it is the envelope of the displacement that is controlled, but in a vibrator the displacement itself is controlled. Of course, in the case of a land resonator or vibrator, a base plate would be substituted in place of the piston used for a marine resonator or vibrator.

The energy spectrum of the output of a swept-frequency source is proportional to the square of its amplitude at the time that it passes through any given frequency, and inversely proportional to the rate of change of frequency with time at that same time. This fact can be exploited to determine the rate of change of frequency as a function of time that is required to produce any required output spectrum that the device is capable of producing, given a stipulated maximum amplitude that the device can produce as a function of frequency. It can also be used to determine the minimal sweep duration required to produce the required spectrum for a given swept-frequency source.

This dependence of spectrum on rate of change of frequency applies to any kind of device that emits acoustic radiation in a frequency sweep: land vibrators, borehole piezoelectric sources, marine vibrators, resonators, sirens, borehole vibrators, etc. Hence, the methodology described herein is very general and applies to any kind of sweeping seismic source for which the limit to output amplitude can be described as a function of frequency. This sort of analysis applies whenever the rates of change of amplitude and frequency are slow compared to the period of the frequency being emitted, regardless of the type of device.

The approach taught herein can be used for a variety of other purposes that have to do with the manipulation or correction of the transmitted signal. For example, if it is desired to obtain a signal with a preferred frequency profile and with a certain duration, then the method can be used iteratively to find the maximum possible amplitude of the output signal spectrum compatible with the physical capabilities of the source and corresponding to a sweep of the desired duration. In general the sweep duration will vary in proportion to the magnitude of the target power spectrum, i.e., twice as much energy is produced by sweeping twice as long.

The teachings of this disclosure can also be used to correct for variation with frequency of the transmission of the signal through the environment. For example the signal transmitted into the subsurface by a marine seismic source is modified by the "ghost" reflection of its signal from the sea surface. This modification can be corrected by an application of the disclosed method in which the desired frequency profile is divided by the unwanted modification. This will produce a farfield signal spectrum of the desired profile. However the method will typically be limited to frequency ranges in which the surface ghost does not produce total extinction or near-extinction of the transmitted signal. It is well-known that such frequency ranges can be adjusted to include the desired frequency range of the source signal by operating the source at a suitable depth below the sea surface.

The instant method can also be used as a design tool by constructing a dynamical model of a proposed controllable source including all aspects of the design that may affect its output. The model is used to estimate the maximum output amplitude of the source as a function of frequency. The instant method can then be used to predict the minimum length of sweep that will be required to produce a desired output spectrum, and can further be used to estimate the impact of design changes on the sweep length so as to arrive at a design that produces the desired spectrum with a sweep not longer than a desired time.

The instant method can be used in conjunction with experimental measurements of the source's maximum output as a function of frequency rather than with estimates based on a dynamical model. All that is required to use the method is a reliable estimate of source maximum output, howsoever derived, and a desired output power spectrum.

In the foregoing, much of the discussion has been discussed largely in terms of conventional seismic surveys, but that was done for purposes of illustration only and not out of an intent to limit the application of the teachings of the instant disclosure to only those sorts of surveys. Those of ordinary skill in the art will understand how the embodiments presented supra could readily be applied, by way of example, to 2D, 3D, 4D, etc., surveys, down hole surveys, or any combination of same, and to cases where the source emits sound in disjoint sweeps, with intervals of relative silence in between, or to cases where the source emits sound continuously or for relatively long time intervals without breaks.

Where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

While the system and method has been described and illustrated herein by reference to certain embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A method of seismic exploration above a region of the subsurface of the earth containing structural or stratigraphic features conducive to the presence, migration, or accumulation of hydrocarbons, the method comprising:
    (a) selecting a controllable source;
    (b) selecting a plurality of parameters characteristic of said controllable source;
    (c) determining limiting curves for each of said selected plurality of parameters as a function of frequency;
    (d) using said determined limiting curves to obtain a constraint curve for said controllable source;
    (e) using said constraint curve to obtain a sweep signal for said controllable source; and,
    (f) using said sweep signal in conjunction with said controllable source to collect seismic data proximate to a region of the subsurface of the earth as part of a sweep profile in which the controllable source operates at or near its maximum acoustic power output to minimize a duration of the sweep or to maximize achievable amplitude for a target frequency profile when the sweep has a predetermined duration.

2. The method of seismic exploration according to claim 1, wherein said controllable source is selected from the group consisting of a marine resonator, a marine vibrator, a land vibrator, and a borehole vibrator.

3. The method of seismic exploration according to claim 1,
    wherein said controllable seismic source is a marine resonator, wherein said marine resonator has a resonator piston, and wherein said selected plurality of parameters characteristic of said controllable source comprise at least two of a maximum resonator piston displacement, a maximum resonator piston velocity, a maximum resonator piston acceleration, and, a maximum resonator piston jerk.

4. The method of seismic exploration according to claim 3, wherein step (c) comprises:
  (c1) determining limiting curves for each of said selected plurality of parameters as a function of frequency, wherein said each of said limiting curves is based on a volume acceleration constraint.

5. The method of seismic exploration according to claim 3, wherein step (c1) comprises:
  (c1) determining limiting curves for each of said selected plurality of parameters as a function of frequency, wherein each of said limiting curves utilizes a volume acceleration constraint determined according to:

$$\ddot{V}(\omega) = A_p \omega^2 x(\omega)$$
$$\ddot{V}(\omega) = A_p \omega v(\omega)$$
$$\ddot{V}(\omega) = A_p a(\omega)$$
$$\ddot{V}(\omega) = A_p \frac{j(\omega)}{\omega}$$

where $\ddot{V}(\omega)$ is said volume acceleration constraint,
where $\omega$ is a frequency,
where $A_p$ is a cross-sectional area of said resonator piston,
where $x(\omega)$ is said resonator piston maximum displacement,
where $v(\omega)$ is said resonator piston maximum velocity,
where $\alpha(\omega)$ a resonator piston maximum acceleration, and,
where $j(\omega)$ is said resonator piston maximum jerk.

6. A method of seismic exploration above a region of the subsurface of the earth containing structural or stratigraphic features conducive to the presence, migration, or accumulation of hydrocarbons, the method comprising:
  (a) selecting a seismic source, said seismic source comprising a piston for generating a controllable swept frequency signal;
  (b) determining at least a maximum piston displacement, a maximum piston velocity, and a maximum piston acceleration;
  (c) using said maximum piston displacement to calculate a displacement limit curve;
  (d) using said maximum piston velocity to calculate a velocity limit curve;
  (e) using said maximum piston acceleration to calculate an acceleration limit curve;
  (f) using said displacement limit curve, said velocity limit curve, and said acceleration limit curve to determine a constrained limit curve;
  (g) using said constrained limit curve to design a sweep schedule for said seismic source whereby the seismic source operates at or near its maximum acoustic power output across the sweep schedule; and,
  (h) using said sweep schedule to collect seismic data proximate to said region of the subsurface of the earth, thereby exploring within said region of the subsurface of the earth.

7. The method of seismic exploration according to claim 6, wherein said seismic source is selected from the group consisting of a marine resonator, a marine vibrator, a land vibrator, and a borehole vibrator.

8. The method of seismic exploration according to claim 6, wherein each of said displacement limit curve, said velocity limit curve, and said acceleration limit curve is a function of frequency and wherein each of said limiting curves is based on a volume acceleration constraint.

9. The method of seismic exploration according to claim 8, wherein said seismic source is a marine resonator, and wherein said displacement limiting curve is calculated according to $$\ddot{V}(\omega) = A_p \omega^2 x(\omega)$$

wherein said velocity limiting curve is calculated according to $$\ddot{V}(\omega) = A_p \omega v(\omega)$$

wherein said acceleration limiting curve is calculated according to $$\ddot{V}(\omega) = A_p a(\omega),$$

where $\ddot{V}(\omega)$ is said volume acceleration constraint,
where $\omega$ is a frequency,
where $A_p$ is a cross-sectional area of said piston,
where $x(\omega)$ is said maximum piston displacement,
where $v(\omega)$ is said maximum piston velocity, and,
where $\alpha(\omega)$ said maximum piston acceleration.

10. A controllable swept frequency seismic source, comprising:
  (a) a housing;
  (b) a piston within said housing, said piston at least for generating a swept frequency seismic signal; and,
  (c) a controller in electronic communication with said piston, said controller containing a sweep schedule for moving said piston within said housing to generate said swept frequency seismic signal, wherein said sweep schedule is determined by a method comprising:
    (c1) determining for said piston at least a maximum piston displacement value, a maximum piston velocity value, and a maximum piston acceleration value;
    (c2) using said maximum piston displacement value to calculate a displacement limit curve;
    (c3) using said maximum piston velocity value to calculate a velocity limit curve;
    (c4) using said maximum piston acceleration value to calculate an acceleration limit curve;
    (c5) using said displacement limit curve, said velocity limit curve, and said acceleration limit curve to determine a constrained limit curve, wherein each of said displacement limit curve, said velocity limit curve, and said acceleration limit curve is a function of frequency, and wherein each of said limiting curves is based on a volume acceleration constraint; and,
    (c6) using said constrained limit curve to design said sweep schedule for said seismic source.

11. The controllable swept frequency seismic source according to claim 10, wherein said controllable swept frequency source is selected from the group consisting of a marine resonator, a marine vibrator, and a borehole vibrator.

12. The controllable swept frequency seismic source according to claim 10, wherein said controllable swept frequency seismic source is a marine resonator, and wherein said displacement limiting curve is calculated according to $$\ddot{V}(\omega) = A_p \omega^2 x(\omega)$$

wherein said velocity limiting curve is calculated according to $$\ddot{V}(\omega)=A_p\omega v(\omega)$$

wherein said acceleration limiting curve is calculated according to $$\ddot{V}(\omega)=A_p\alpha(\omega),$$

where $\ddot{V}(\omega)$ is said volume acceleration constraint,
where $\omega$ is a frequency,
where $A_p$ is a cross-sectional area of said piston,
where $x(\omega)$ is said maximum piston displacement,
where $v(\omega)$ is said maximum piston velocity, and,
where $\alpha(\omega)$ said maximum piston acceleration.

13. A method of seismic exploration above a region of the subsurface of the earth containing structural or stratigraphic features conducive to the presence, migration, or accumulation of hydrocarbons, the method comprising:
  (a) selecting a seismic source, said seismic source comprising a piston for generating a controllable swept frequency signal;
  (b) determining a maximum piston displacement, a maximum piston velocity, a maximum piston acceleration, and a maximum piston jerk;
  (c) for each of said determined maximum piston displacement, maximum piston velocity, maximum piston acceleration, and maximum piston jerk, calculating a corresponding limit curve;
  (d) using said corresponding limit curves to determine a constrained limit curve;
  (e) using said constrained limit curve to design a sweep schedule for said seismic source; and,
  (f) using said sweep schedule to collect seismic data proximate to said region of the subsurface of the earth, thereby exploring within said region of the subsurface of the earth.

14. The method of seismic exploration according to claim 13, wherein said seismic source is selected from the group consisting of a marine vibrator, a land vibrator, and a borehole vibrator.

15. A method of seismic exploration of a subsurface target, the method comprising:
  (a) accessing a plurality of seismic traces collected proximate to said subsurface target, wherein said plurality of seismic traces are acquired by a collection method comprising:
    (a1) selecting a seismic source, said seismic source comprising a piston for generating a controllable swept frequency signal;
    (a2) determining a maximum piston displacement, a maximum piston velocity, a maximum piston acceleration, and a maximum piston jerk;
    (a3) for each of said determined maximum piston displacement, maximum piston velocity, maximum piston acceleration, and maximum piston jerk, calculating a corresponding limit curve;
    (a4) using said corresponding limit curves to determine a constrained limit curve;
    (a5) using said constrained limit curve to design a sweep schedule for said seismic source;
    (a6) using said sweep schedule to collect said plurality of seismic traces proximate to said subsurface target; and,
  (b) using at least a portion of said accessed plurality of processed seismic traces to explore for hydrocarbons proximate to said subsurface target.

\* \* \* \* \*